United States Patent [19]

Alneng

[11] 4,409,906
[45] Oct. 18, 1983

[54] CLAMPING DEVICE FOR JOINING BOARDS

[76] Inventor: Carl-Göran Alneng, Robertsviksvägen 16, S-182 35 Danderyd, Sweden

[21] Appl. No.: 249,471

[22] Filed: Mar. 31, 1981

[51] Int. Cl.³ .............................................. A47B 57/00
[52] U.S. Cl. ..................................... 108/64; 108/114; 52/461; 52/467; 52/584; 52/586
[58] Field of Search .............. 52/584, 483, 467, 468, 52/471, 463, 461, 466, 586; 108/64, 114

[56] References Cited

U.S. PATENT DOCUMENTS

| 951,112 | 3/1910 | Grenier | 52/461 |
|---|---|---|---|
| 1,169,240 | 1/1916 | Coleman | 52/467 |
| 1,812,009 | 6/1931 | Lenke | 52/461 |
| 2,907,287 | 10/1959 | Trostle | 52/467 |
| 3,335,537 | 8/1967 | Mackey | 52/467 |

FOREIGN PATENT DOCUMENTS

| 1312603 | 11/1962 | France | 52/483 |
|---|---|---|---|
| 118226 | 2/1947 | Sweden | 52/584 |

Primary Examiner—John E. Murtagh
Assistant Examiner—Kathryn L. Ford
Attorney, Agent, or Firm—McAulay, Fields, Fisher, Goldstein & Nissen

[57] ABSTRACT

A clamping device (FIG. 1) is provided for joining together boards (1,2) lying edge to edge in the same plane, and comprises a fixing rail (20) with upwardly directed flanges (21,22) at a mutual angle of about 90°, a pair of trough-like members (12,13) each bearing against the inside of one of said flanges (21,22), the side surface of one side (14) of said members (12,13) each bearing against the under side of a board (1,2) with its other side edge (15) engaging in a groove (16,17) in each board (1,2), there being a tensioning rail (9) with outwardly directed flanges engaging in slots (7,8) in the edge surfaces (3,4) of the boards (1,2), and clamping bolts (23) between the fixing rail (20) and tensioning rail (9) for urging the fixing rail towards the members (7,8) serving to support the boards (1,2) and press their edges (3,4) towards each other.

10 Claims, 10 Drawing Figures

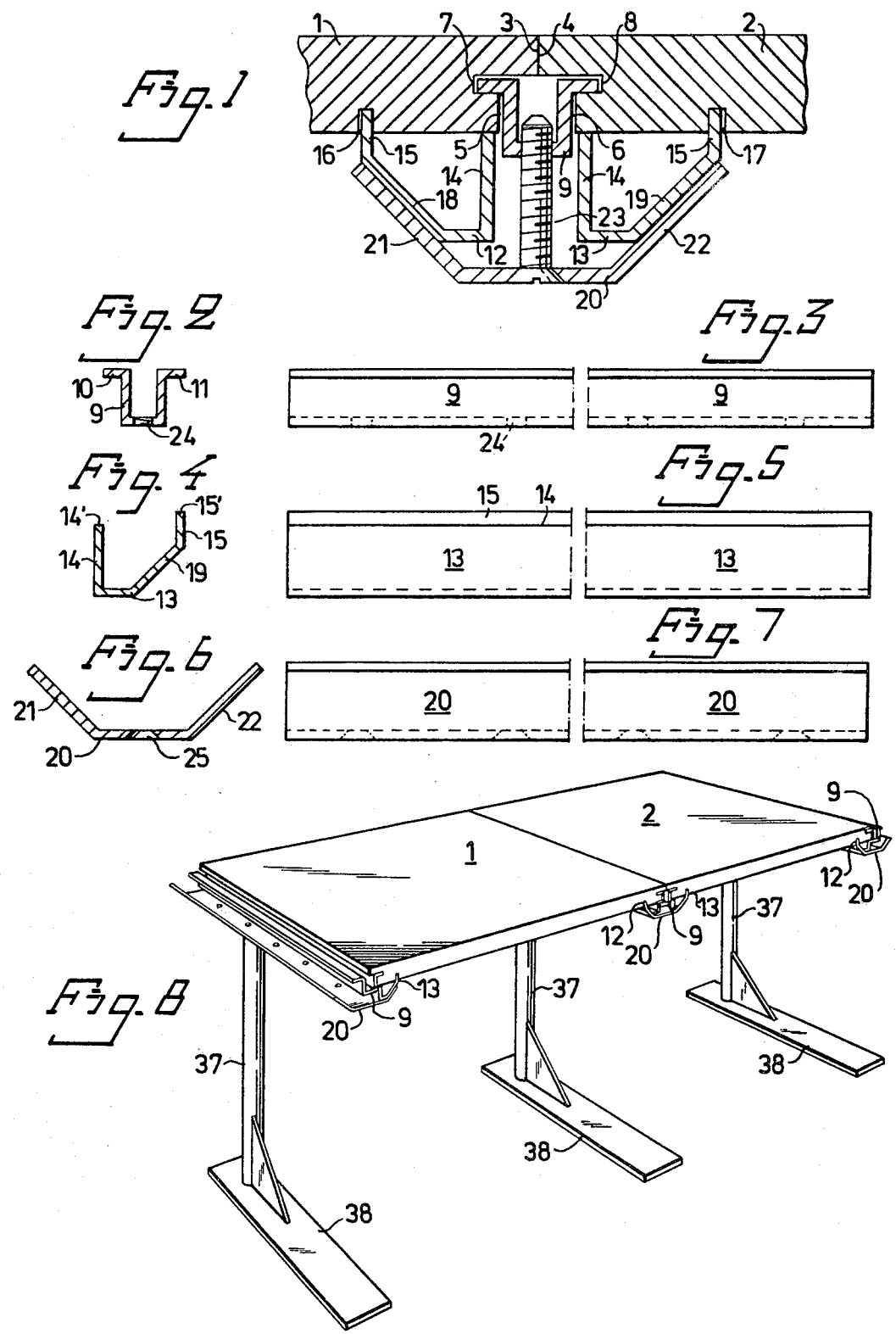

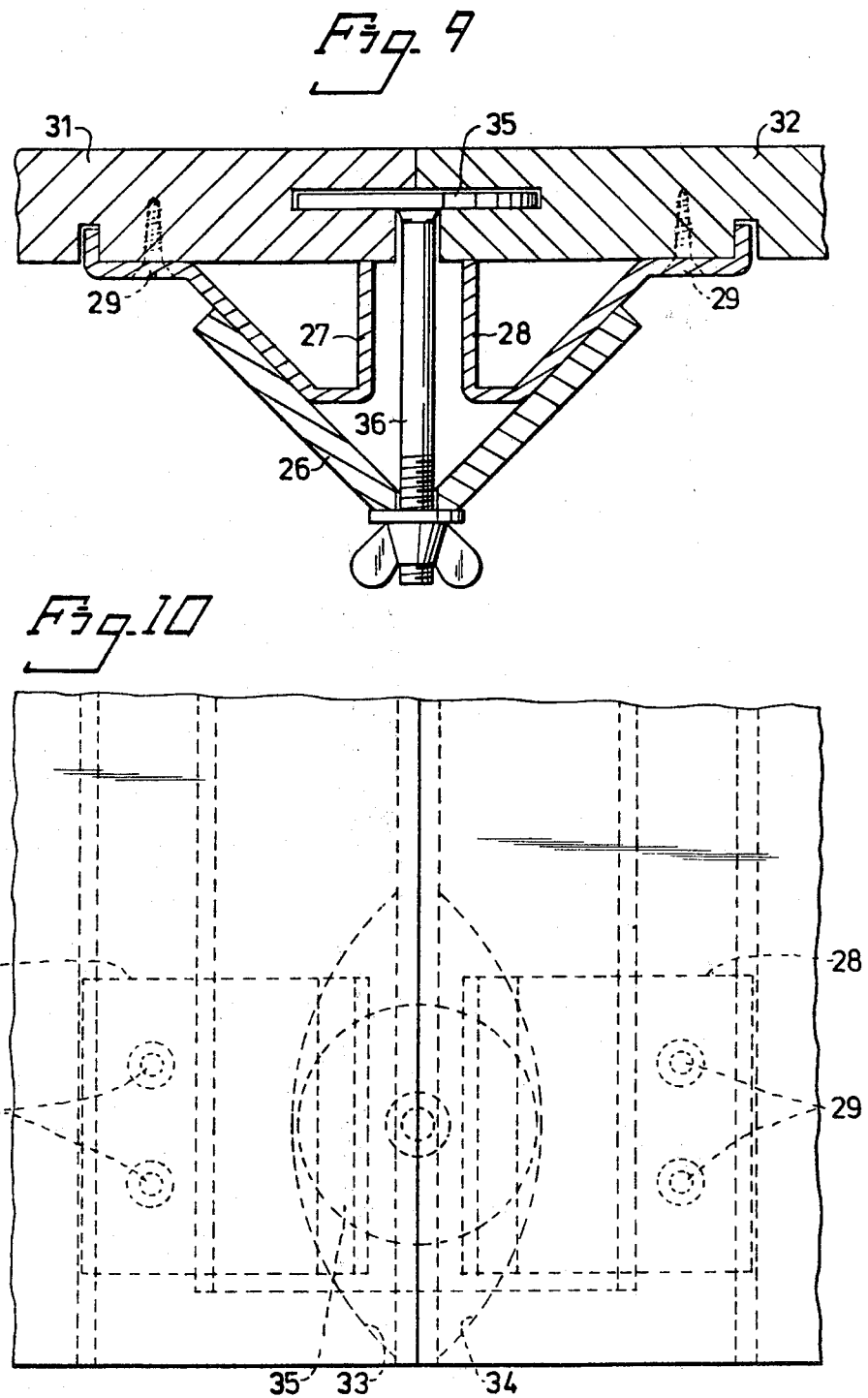

CLAMPING DEVICE FOR JOINING BOARDS

FIELD OF THE INVENTION

The present invention relates to a clamping device for the joining of boards, panels etc. which are substantially in the same plane and have mutually abutting edge surfaces.

In joining panels together it is already known to provide the underside of the panels close to the edges with stops or abutments and to utilize a clamp having two limbs and a screw between them, which is applied in such a way that the limbs bear against the outsides, relative to the edges, and when the screw is tightened it urges the limbs and thereby the boards toward each other. As a result, the screw is parallel to the boards so that the tensioning force acts parallel to the plane of the boards, and not at right angles thereto in any degree, so that the stability at the joint is unsatisfactory and must be made reliable by some special arrangement.

OBJECT AND SUMMARY OF THE INVENTION

The present invention has the object of providing a clamping device for joining boards edge to edge which gives clamping forces parallel, as well as at right angles, to the plane of the boards, whereby extremely good stability is achieved.

This task is solved in accordance with the invention by means of a clamping device, the characterizing features of which are disclosed in the following claims.

BRIEF DESCRIPTION OF THE DRAWING

The invention is illustrated by a pair of embodiments illustrated by way of example on the attached drawings.

FIG. 1 is a vertical cross section through a clamping device in accordance with the invention as used on a pair of boards.

FIGS. 2–7 are a cross section and front elevation for each of three parts included in the clamping device.

FIG. 8 is a perspective view of a pair of tables joined together by means of the inventive clamping device.

FIG. 9 is a vertical cross section through a modified clamping device in accordance with the invention in use with a pair of boards.

FIG. 10 is top plan view of two portions of boards joined together by means of the clamping device according to FIG. 9.

DISCLOSURE OF BEST MODE

According to the embodiment illustrated in FIGS. 1–8, there is shown in FIG. 1 a portion of two tabletop panels or leaves 1,2, the respective edge surfaces 3,4 of which abut against each other with a portion of their thickness, but are otherwise separated by hallowed out recess 5,6, each formed into a slot 7,8 at its inner portion. A U-shaped tensioning rail 9 extends along the edge surfaces 3,4 to substantially the whole length thereof and is provided with outwardly directed flanges 10,11 (FIGS. 2,3) in engagement with their respective slot 7,8.

Against the under sides of the panels 1,2 and on either side of the tensioning rail 9 there is a substantially trough-shaped member 12,13 mounted parallel to the edge surfaces 3,4 such that with the edge surface 14' of one of its sides 14, FIGS. 4,5, it bears against the under side of the respective board, and with its other side edge portion 15 it engages in a groove 16,17 along the under side of each board with its edge surface 15' preferably bearing against the respective board. The member 12,13 is also provided with two outer sides 18,19 which form a mutual angle of 90°. A trough-shaped fixing rail 20 has sides 21,22, FIGS. 6,7 mutually forming a 90° angle, and said fixing rail is urged against the members 12,13 to bear against their outer sides 18,19 by means of a plurality of screws 23 distributed along said rail 20 and arranged for screwing into the tensioning rail 9 by means of threaded holes 24 therein, the screws having their heads resting in countersunk holes 25 in said rail.

The clamping device in accordance with the invention which has been described has the following advantages. When the screws 23 are tightened, the fixing rail 20 is urged against the members 12,13 and, due to said 90° angle, the members 12,13 are caused to urge the boards 1,2 tightly against each other while the members 12,13 bear against the under sides of the boards 1,2 with their end surfaces 14',15', whereby the boards are given the same level, and the tensioning forces parallel and rightangular to the plane of the boards 1,2 give an extremely stable joint. The recesses 5,6, slots 7,8 and grooves 16,17 required in a pair of boards at their edge surfaces, as well as the tensioning rails 9, members 12,13 and fixing rails 20 with the screws required in the clamping device are all easily produced by machine, and joining the boards edge to edge or dismantling them is easily carried out by fitting or dismantling said clamping device.

The embodiment illustrated in FIGS. 9 and 10 differs from the one illustrated in FIGS. 1–8 substantially solely in that the fixing rail 26 is an angle section (which, as with the other parts in the clamping device can be of light metal, if so desired), this section having a 90° angle between its flange and extending the whole length of the joint. The members 27,28 indeed have a cross section similar to the members 12,13 in FIG. 1, but they are much shorter, as shown in FIG. 10, and are attached by means of screws 29. Instead of the slots 7,8 and tensioning rail 9 in FIG. 1, each board 31,32 has short slots 33,34 (FIG. 10) for the flat head 35 of the tensioning screw 36.

This embodiment in accordance with the invention also has similar advantages as those described for the device according to FIGS. 1–8, and the embodiment with the flat screw head is simpler than the tensioning rails 9, but on the other hand, assembly of a plurality of members 27,28 requires increased work.

FIG. 8 illustrates the clamping device being used for joining tabletop boards 1,2, and near one end each fixing rail 20 is carried by a leg 37, with a foot 38 parallel to the longitudinal axis of the fixing rail 20, although the rail can naturally be carried by any means at all. The clamping device can be utilized for removably joining together the edges of a plurality of different object such as counter boards, shelving, shop fittings in shops, stores, exhibition rooms and storage rooms, as well as for casings comprising several parts for casting concrete in conjunction with building houses and the like.

The invention is not to be regarded as limited solely to the described embodiments shown in the drawings, since these can be modified within the scope of the invention, particularly with regard to details thereof. For example, the given 90° angle can be varied depending on the desired mutual magnitude relationship between the resulting forces. When utilizing a flat screw head instead of a tensioning rail, the slots along the meeting edge surfaces can be replaced by appropriate recesses for the screw heads.

I claim:

1. A clamping device for joining together panel members lying substantially in the same plane with edges in abutting relationship but partially spaced by recesses providing a clearance therebetween and terminating into slots extending along said plane, said members having grooves on their undersides from said edges, comprising:
a tensioning member extending along said edges and into said slots;
securing members, each having an inner upstanding side bearing against said underside of said panel members near said recesses thereof on either side of said tensioning member;
said securing members having an outer side terminating in flanges bent to provide engagement with said grooves;
a generally trough-shaped, horizontal rail member bearing against said securing members; and
screw means fitting in said rail member and passing through said clearance for urging said rail member against said securing members thereby driving said securing members toward each other until said edges of panel members are in tight abutment.

2. The clamping device of claim 1, wherein said rail member extends along substantially the entire length of said edges of panel members.

3. The device of claim 1, having a plurality of securing members along said rail member.

4. The device of claim 1, wherein said securing rail is attached to at least one vertical leg, said leg having a foot parallel to said rail for resting said device on a flat surface.

5. The device of claim 4, wherein said foot extends substantially for the entire length of said rail.

6. The device of claim 1, wherein said tensioning member has a generally U-shaped cross-section with outwardly directed flanges engaging said slots.

7. The device of claim 1, wherein said rail member has a bottom with a plurality of threaded holes for said screw means.

8. The device of claim 1, wherein said securing members have outer sides which mutually form an angle of 90° and said rail has outer sides forming the same angle.

9. The device of claim 1, wherein said tensioning member is the flat head of a tensioning screw; said screw being threaded in said rail.

10. The device of claim 1, wherein said securing members are fixed to said undersides of said panel members near said grooves.

* * * * *